Sept. 7, 1965  S. C. DENTON  3,204,948
UNIVERSAL ADJUSTABLE HOLDING VISE
Filed Aug. 8, 1963  2 Sheets-Sheet 1
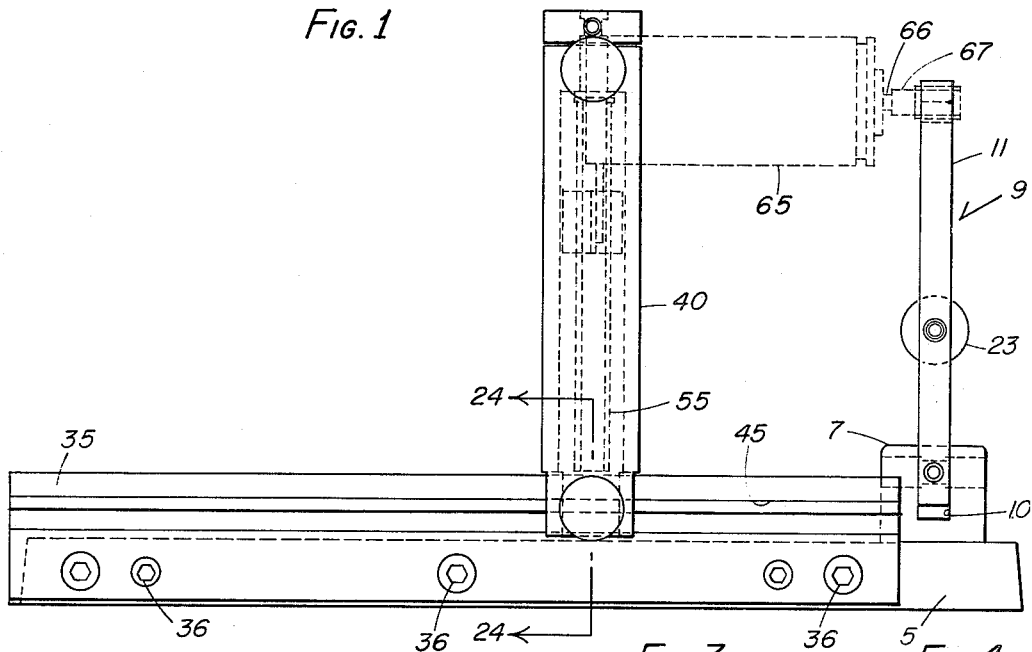
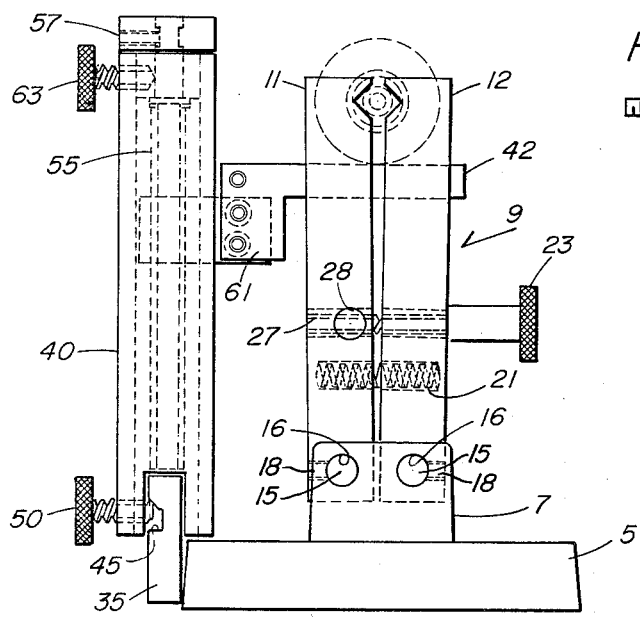
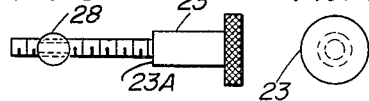
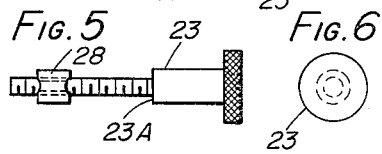
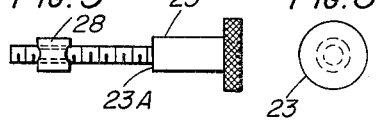
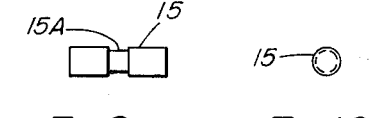
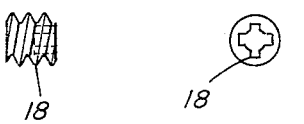
INVENTOR.
STERLING C. DENTON
BY
Roy Griffette Jones

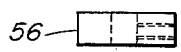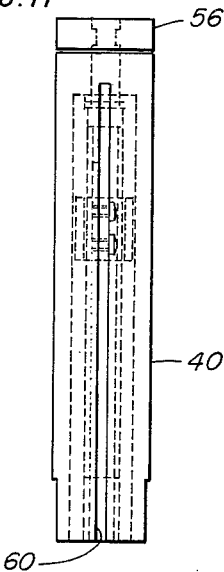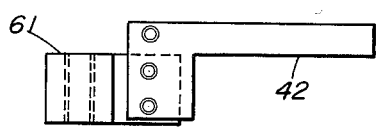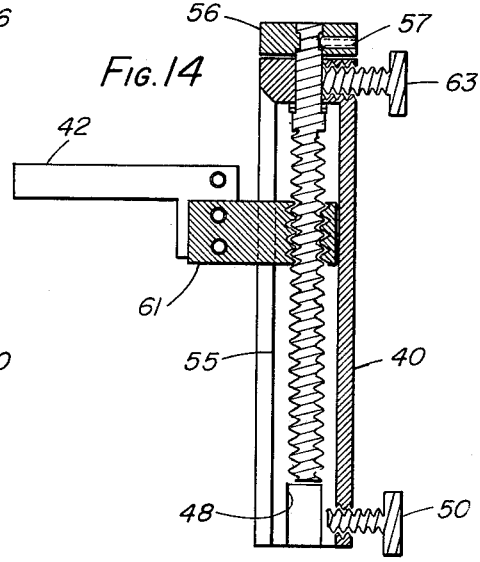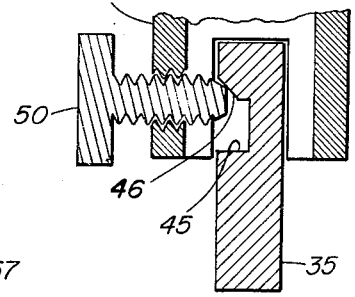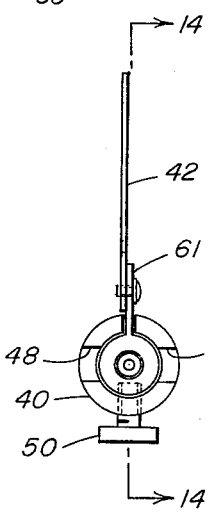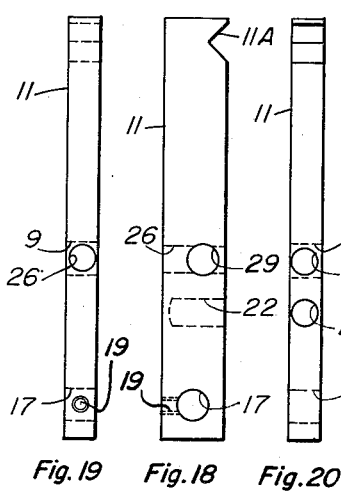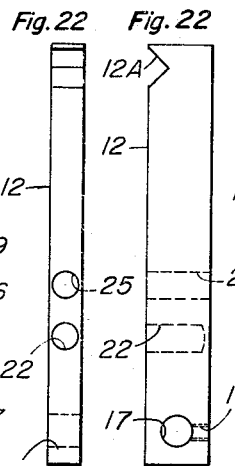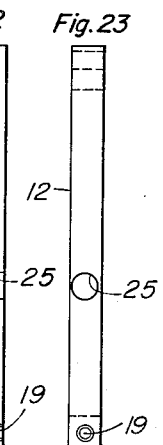

United States Patent Office 3,204,948
Patented Sept. 7, 1965

3,204,948
UNIVERSAL ADJUSTABLE HOLDING VISE
Sterling C. Denton, 655 Black Oak Ridge Road, Wayne, N.J.
Filed Aug. 8, 1963, Ser. No. 300,852
2 Claims. (Cl. 269—239)

This invention relates to a vise for holding work pieces of high precision, and to auxiliary supporting structure for the work held in the vise.

A specific use for the device of this invention is to support in a true position parts which are to be secured together by drilling a hole, putting a pin therein, and then staking the pin. More specifically, and by way of example, when a threaded sleeve, or a gear, is placed over the projecting end portion of the shaft of a miniature, high precision, generator-motor set, a hole is drilled radially through the sleeve and shaft, or gear hub and shaft, to receive a pin which is staked after insertion. It is required that the hole be at right angles to the shaft and sleeve and that the longitudinal center line of the hole pass through the longitudinal center line of the generator-motor shaft. As a condition, the shaft of the motor-generator must be truly horizontal and must not be in the least bent by the weight of the motor while held in the vise. For the reasons stated, the vise and the auxiliary structure for supporting the work are constructed with high precision, and they are adapted to hold a variety of work pieces, as contrasted with the different jigs, clamps, fixtures now generally used and made for each kind of work piece.

The drawings illustrate the invention, and in these:

FIG. 1 is a front elevation of the device;

FIG. 2 is a right end elevation of FIG. 1;

FIGS. 3 and 4 are respectively front plan and end views of a thumb screw used in opening and closing the jaws of the vise;

FIGURES 5 and 6 are respectively top plan and end views of the thumb screw of FIGURES 3 and 4;

FIGS. 7 and 8 are respectively plan and end views of a rockable pin used to pivotally mount the vise jaws;

FIGS. 9 and 10 are respectively plan and end views of a Bristol wrench screw used to lock the vise jaws to the pin of FIGS. 7 and 8;

FIG. 11 is an elevation of the back of a column which is slidably attached to the base and contains means for raising and lowering a support for a work piece, the internal mechanism being indicated in dash lines;

FIGS. 12 and 13 are respectively plan and side views of a cap forming part of the column of FIG. 11;

FIG. 14 is a longitudinal section on line 14—14 of FIG. 15;

FIG. 15 is a bottom plan view of the structure indicated in FIG. 14;

FIGS. 16 and 17 are respectively elevation and bottom plan views of the vertically movable work rest attached to the mechanism of the column of FIG. 14;

FIGS. 18, 19 and 20 are respectively elevation, left side and right side views of the left vise jaw shown in FIG. 2;

FIGS. 21, 22 and 23 are views of the right vise jaw as shown in FIG. 2 and corresponding to FIGS. 18, 19 and 20; and FIG. 24 is an enlarged fragmentary section of the column of FIGS. 1, 2, 11 and 14 and of the rail on which it rides, and of a set screw for locking the column to the rail, and is a section on line 6—6 of FIG. 1.

Referring to the drawing for a detailed description, the device comprises an oblong base 5 which has, at one end, an elevated portion 7 to form the direct base for the vise. The elevation 7 is divided, in a direction crosswise relative to the base 5, by a slot 10 (FIG. 1), to receive the lower end portions of a pair of coacting and coplanar, elongate vise jaws 11 and 12. The jaws 11 and 12 are pivotally mounted on the elevation 7 to move towards and away from each other, and they have opposed, allochiral notches 11A and 12A respectively at the upper portions of their inner edges, being accurately cut to hold horizontal the piece or part on which drilling or other work is to be done. The jaws are each pivoted on the elevation 7 by a pin 15 (FIGS. 7 and 8), each pin passing through a transverse hole 16 (FIG. 2) in said divided elevation and through a transverse hole 17 in the lower end portions of jaws 11 and 12. The latter are locked to the pins by set screws 18 (FIGS. 9 and 10), which screws are in threaded holes 19 (FIGS. 18–23) formed in the outer sides of the jaws. The jaws 11 and 12 bear against the reduced middle section 15A of the pins, as shown in FIG. 7.

Said jaws 11 and 12 are spread apart by a compressed helical spring 21 (FIG. 2) which is inset in recesses 22 formed in the inner sides of the jaws, and the latter are drawn together by a thumbscrew 23 (FIGS. 3 and 5). The thumbscrew enters the jaws by the side, first entering a plain or unthreaded lateral hole 25 in jaw 12, and then into the plain lateral hole 26 in jaw 11, where it passes through a threaded diametral hole formed in a turnable plug 28 (FIGS. 2, 3 and 5) which is inserted in transverse hole 29 formed in jaw 11 and adapted to turn axially therein to accommodate to the changing position of the screw as the latter is turned and the jaws change position. The shoulder 23A (FIGS. 3 and 5) of the thumbscrew 23 is always against the outer side of jaw 12.

A horizontal rail 35 (FIGS. 1 and 2) is detachably secured by screws 36 to the long front side of the base 5 and rises above it, and is at right angles to the plane of movement of the jaws of the vise. A hollow, vertical column 40 (FIGS. 1, 2, 11 and 14) is slidably mounted on the rail so that it may be positioned at suitable distances from the vise, according to the length of the work piece, which work piece may be partly supported by the vise and partly by a horizontal rest arm 42 (FIGS. 2, 14, 16 and 17). The arm is at right angles to the rail, and is supported by, and adapted to be moved up and down by mechanism within the column 40 and described below.

To hold the column 40 and its internal mechanism in a true vertical position, the front and back faces of the rail 35 are truly vertical and its top surface is accurately normal to the faces. The back face is plain, but the front face (FIG. 1) has a longitudinal groove 45 (FIGS. 1, 2 and 24) below the top surface of the rail and exactly parallel therewith, and has a cross sectional form shown in the figures just mentioned. FIG. 24, which is an enlarged cross section, shows the upper front part as being defined by a downwardly-inwardly directed surface 46, the utility of which will be stated below. The lower end portion of the hollow column 40 has a diametral slot 48 so that it fits over the upper part of rail 35, the defining boundaries of the slot 48 being accurately vertical at the sides and accurately horizontal at the top. To hold the column securely to the faces of the rail, a set screw 50 is threaded through a wall of the column and enters groove 45 of the rail, and contacts the slanted surface 46, thereby pulling down, by the vertical reaction component, on the column, to hold it firmly on the top surface of the rail.

Within the column 40, there is a vertical, elongate screw 55 which is turned by the column cap 56, to which cap the upper end portion of the screw is attached by a set screw 57 (FIGS. 2 and 14). One wall of the column 40 has a vertical slot 60 (FIG. 11) extending from near the top to the bottom of the column. A short horizontal connecting member 61 passes through this slot and is in threaded engagement with screw 55, and connects the work rest 42 to the screw so that the rest may be raised and lowered to the desired level. To lock the work rest at such level, a set screw 63 (FIGS. 2 and 14) is tightened against the upper part of the screw 55, screw 63 being in threaded engagement with the wall of the column.

FIG. 1 shows a miniature motor-generator set 65, having a shaft 66 over which is a sleeve 67 threaded at its outer end for attachment of a gear. The sleeve and the shaft within are held in the vise for the drilling of a hole radially through the unthreaded portion of the sleeve and through the shaft, for the insertion of a connecting pin therein and its subsequent staking, to connect the sleeve to the shaft. Inasmuch as the weight of the set will bend the shaft, but imperceptibly, the left end of the set is supported on the work rest 42, the latter being raised to the proper level.

What is claimed is:

1. A vise comprising a base, a pair of coacting jaws pivotally and separately mounted on the base and rising thereabove and adapted to move toward and away from each other in a vertical plane, said jaws having a pair of opposed allochiral crosswise notches in their inner side and normal to the plane of movement of the jaws, screw means for moving the jaws toward each other, a horizontal rail attached to one side of the base at a right angle to the plane of movement of the vise jaws, a hollow column attached to the rail and slidable thereon, a horizontal rest bar, to support work, extending from the column parallel to the plane of motion of the vise jaws, and screw means within the column for raising and lowering the rest arm.

2. The vise of claim 1 in which said hollow column is slidably movable with respect to said horizontal rail, locking means for holding said hollow column against said horizontal rail, said locking means forcing the top surface of said horizontal rail against a flat horizontal bottom surface of said hollow column.

References Cited by the Examiner
UNITED STATES PATENTS

| 275,341 | 4/83 | McLane | 269—248 |
| 516,677 | 3/94 | Cross | 143—132.2 |
| 703,326 | 6/02 | Webber | 269—246 |
| 1,987,294 | 1/35 | Haskins | 269—239 X |
| 2,085,321 | 6/37 | Lang | 269—152 X |

FOREIGN PATENTS

| 925,196 | 3/47 | France. |

ROBERT C. RIORDON, *Primary Examiner.*